US008923817B2

(12) United States Patent
de Sousa

(10) Patent No.: US 8,923,817 B2
(45) Date of Patent: Dec. 30, 2014

(54) MOBILITY DEVICE SECURITY

(75) Inventor: David Reis de Sousa, Bairro Lourdes Belo Horizonte (BR)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/567,528

(22) Filed: Aug. 6, 2012

(65) Prior Publication Data

US 2014/0038556 A1 Feb. 6, 2014

(51) Int. Cl.
*H04M 1/68* (2006.01)
*H04W 12/06* (2009.01)

(52) U.S. Cl.
CPC .................................. *H04W 12/06* (2013.01)
USPC ........ 455/411; 455/418; 455/550.1; 709/203; 709/206

(58) Field of Classification Search
CPC ... H04W 12/06; H04W 12/08; H04L 63/0853
USPC ........... 455/410–411, 418–420; 709/203–206
See application file for complete search history.

(56) References Cited

U.S. PATENT DOCUMENTS

| | | | |
|---|---|---|---|
| 6,300,863 B1 | 10/2001 | Cotichini et al. | |
| 6,530,018 B2 | 3/2003 | Fleming, III | |
| 7,027,808 B2 * | 4/2006 | Wesby | 455/419 |
| 7,925,249 B2 * | 4/2011 | Funk et al. | 455/419 |
| 8,107,944 B2 * | 1/2012 | Cohan | 455/419 |
| 8,131,281 B1 * | 3/2012 | Hildner et al. | 455/418 |
| 8,145,199 B2 * | 3/2012 | Tadayon et al. | 455/418 |
| 8,401,521 B2 * | 3/2013 | Bennett et al. | 455/411 |
| 8,560,012 B2 * | 10/2013 | Ohnishi et al. | 455/556.1 |
| 2003/0088633 A1 * | 5/2003 | Chiu et al. | 709/206 |
| 2006/0089124 A1 * | 4/2006 | Frank et al. | 455/411 |
| 2006/0272020 A1 | 11/2006 | Gardner | |
| 2007/0234427 A1 | 10/2007 | Gardner | |
| 2010/0112983 A1 * | 5/2010 | Walker et al. | 455/411 |
| 2010/0210240 A1 * | 8/2010 | Mahaffey et al. | 455/411 |
| 2011/0045801 A1 * | 2/2011 | Parker, II | 455/411 |
| 2012/0244883 A1 * | 9/2012 | Tibbitts et al. | 455/456.2 |

OTHER PUBLICATIONS

LoJack Now Available for Android Tablets, Apr. 17, 2012 by Raja, 222.iandroidtablet.com/news/lojack-now-available-for-android-tablets/.
LoJack Now Available for Android Tablets, Apr. 17, 2012 by Raja, www.iandroidtablet.com/news/lojack-now-available-for-android-tablets/.

* cited by examiner

*Primary Examiner* — Sharad Rampuria
(74) *Attorney, Agent, or Firm* — Morris & Kamlay LLP

(57) ABSTRACT

The present disclosure provides a system to establish a stable ownership relationship between an online identity and a mobile device. This relationship is persistent across device wipes and operating system reinstalls. Remote commands enable a user to: locate the mobile device; wipe user data off the mobile device; disable the mobile device; display a permanent message on the mobile device; and return a disabled mobile device to normal. Ownership is established when the mobile device is purchased. Thereafter, the ownership is maintained in a host sever through an association between a unique identifier of the mobile device and the owner's online identity. The owner of the mobile device may remotely send an encrypted command to the mobile device, for example, if the mobile device is lost or stolen. The encrypted command is decrypted by the mobile device and the result of the command may be returned remotely to the owner.

18 Claims, 5 Drawing Sheets

MOBILITY DEVICE SECURITY

CROSS-REFERENCE TO RELATED APPLICATIONS/INCORPORATION BY REFERENCE

Not Applicable

FIELD

Certain embodiments of the disclosure relate to mobile device security. More specifically, certain embodiments of the disclosure relate to a method and system for securely controlling a mobile device from a remote location.

BACKGROUND

Mobile communications have changed the way people communicate and mobile devices have been transformed from a luxury item to an essential part of everyday life. As the number of mobile devices continues to increase, significant efforts exist with regard to making such devices more secure. Applications and services exist that reportedly allow a user to find a missing phone, for example, if the phone is lost or stolen. However, such "find my phone" services may be thwarted by performing a device restore or by reinstalling the device's original operating system.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for mobile device security, substantially as shown in and/or described in connection with at least one of the figures, as set forth more completely in the claims. For example, a server is provided for mobile device security. The server comprises a memory, a network connection, a processor, and a transmitter. The memory stores a unique identifier associated with the mobile device. The network connection receives a command intended for the mobile device. The processor verifies ownership of the mobile device according to the unique identifier and an online identity of the user. And, the transmitter transmits the command to the mobile device.

These and other advantages, aspects and novel features of the present disclosure, as well as details of an illustrated embodiment thereof, will be more fully understood from the following description and drawings.

DETAILED DESCRIPTION

Certain embodiments of the disclosure may be found in a method and system for mobile device security. The disclosure provides for secure control of a mobile device, and this secure control may be enabled remotely. Aspects of the present disclosure also provide a system to establish a stable ownership relationship between an online identity and a mobile device. This relationship may be persistent across device wipes and operating system reinstalls. Through an online service, the owner of the mobile device may send one or more remote commands to: 1) locate the mobile device on a map; 2) wipe user data off the mobile device; 3) disable the mobile device; 4) display a permanent message on the screen of the mobile device; and 5) return a disabled mobile device to normal. A disabled device may be turned on but incapable of receiving user input.

Ownership may be established when the mobile device is purchased. Thereafter, the ownership is maintained in a host device such as a remote sever through an association between a unique identifier of the mobile device and the owner's online identity. The owner of the mobile device may remotely send an encrypted command to the mobile device, for example, if the mobile device is lost or stolen. The encrypted command is decrypted by the mobile device and the result of the command may be returned remotely to the owner.

The online identity may be, for example, a Google Account. The coupling of a smartphone with an online service provided by Google is used in the foregoing description as an example. The disclosure, however, also applies to other mobile devices with an internet connection, made by other manufacturers, for example a tablet computer, a camera or an automobile may be the mobile device. Likewise, the online service provider may be one other than Google.

Figure 1:
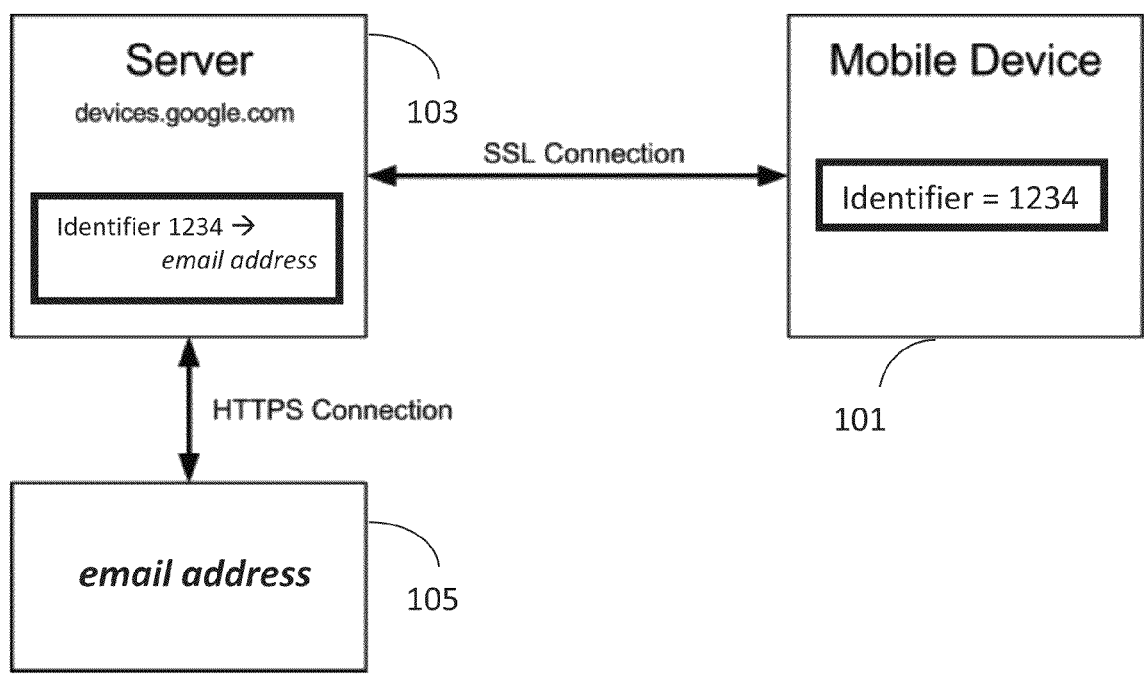
FIG. 1 is a block diagram of an example system for secure control of a mobile device, in accordance with an embodiment of the disclosure.

FIG. 1 is a block diagram of an example system for secure control of a mobile device, in accordance with an embodiment of the disclosure. FIG. 1 comprises a mobile device 101, a server 103, and a remote device 105.

The mobile device 101 is associated with a device identifier. For example, a unique device identifier may be a combination of one or more of the International Mobile Equipment Identity (IMEI), the Media Access Control (MAC) address, serial number, synthetic ID and permanent ID of the mobile device 101. In FIG. 1, and example identifier of "1234" is illustrated.

Ownership is persistent across factory resets so it may be implemented in the operating system software or in the hardware of the mobile device 101. Owner authentication may be handled completely on the server. For example, the ownership information for the mobile device 101 may be kept on a Google server 103 and the mobile device 101 may have a permanent secure connection (e.g. SSL connection) with the Google server 103 as the server.

The server 103 may store a table that links the device identifier (e.g., 1234) to a user identity (e.g., email address). The server 103, as the host, authenticates the user. When the server 103 verifies that the user at the remote device 105 is the device owner, the server 103 may forward commands from the user at the remote device 105 to the mobile device 101. A mobile device's operating system may initiate and maintain a connection to the server 103. For example, the connection may be initiated whenever the mobile device 101 connects to the internet.

In FIG. 1, ownership may be established by a secure interaction between the mobile device 101 and the server 103. From ownership establishment until ownership is revoked, the mobile device 101 may accept any commands coming from the server 103. Since ownership information is kept on the server 103, maintaining device identification stability is performed to enable the ownership information to remain stable.

The user at the remote device 105 may access a website, to perform actions such as: 1) ringing the mobile device (e.g. when the phone is misplaced); 2) locating the device on a map using GPS; 3) wiping all user data (i.e. perform a factory reset, including clearing the SD card); 4) disabling the mobile device and optionally displaying a user entered message (e.g. "Return this cellphone to the university Lost & Found" or "Return to email address for a reward"); and 5) reenabling a disabled mobile device. Since the disabled state mentioned in item 4 is persistent across factory resets, the phone would be worthless on the black market.

The connection between the mobile device 101 and the server 103 may operate using an encrypted connection, such as SSL or HTTPS. Likewise, the connection between the server 103 and at the remote device 105 may operate using an encrypted connection, such as SSL or HTTPS.

Figure 2:
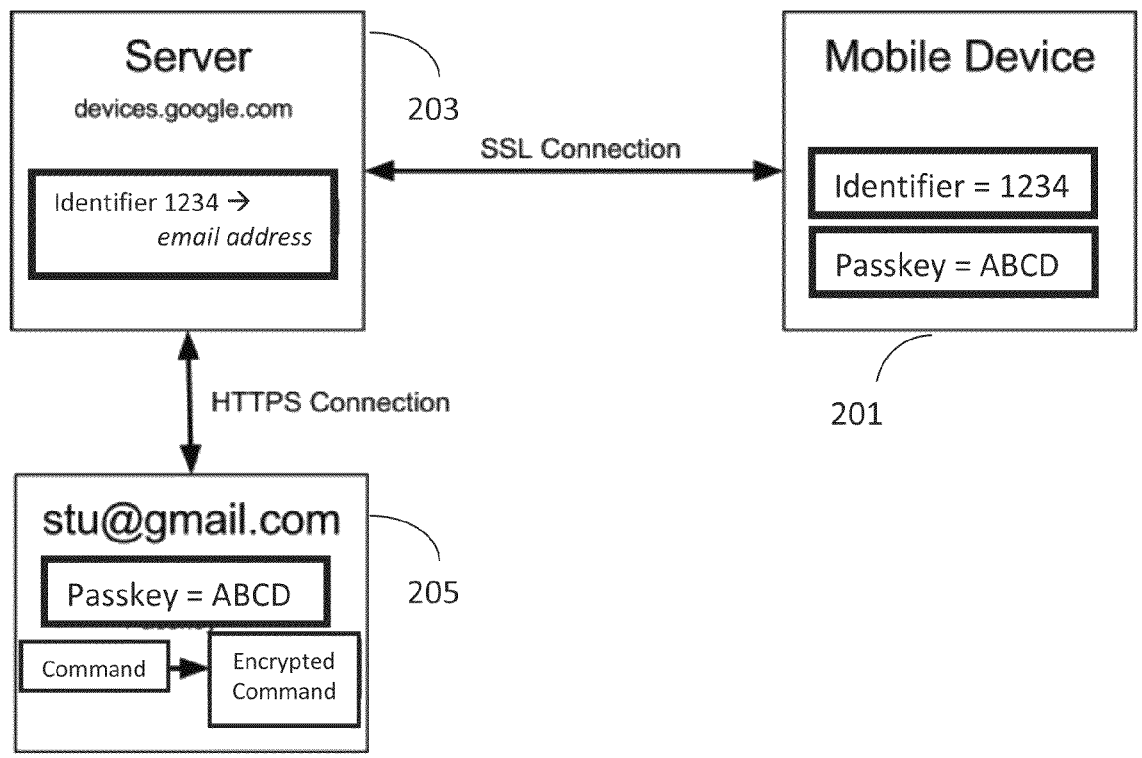
FIG. 2 is a block diagram of another example system for secure control of a mobile device, in accordance with an embodiment of the disclosure.

FIG. 2 is a block diagram of another example system for secure control of a mobile device 201, in accordance with an embodiment of the disclosure. To increase privacy, the server 203 is unable to control the mobile device 201 without the authorization of the user 205.

In FIG. 2, a command is composed by a user at the remote device 205, for example on an internet browser. This command is encrypted with a user supplied passkey. The server 203 authenticates the user and forwards the encrypted command to the mobile device 201. The mobile device 201 holds the passkey, which was set when ownership was first established. The mobile device 201 uses the passkey to decrypt the command, execute it and then sends a response to the server 203. The server 203 then forwards the response to the user at the remote device 205.

The passkey is stored on the mobile device 201 in a way that it is kept across factory resets. Since the passkey is never stored on server 203, it is impossible for a service provider to control the mobile device 201 without the authorization of the user. The disadvantage may be that the user must remember the passkey. Alternatively, the passkey can be the user password, which makes it unnecessary for the user to remember another password but requires special treatment when the password is changed.

Figure 3:
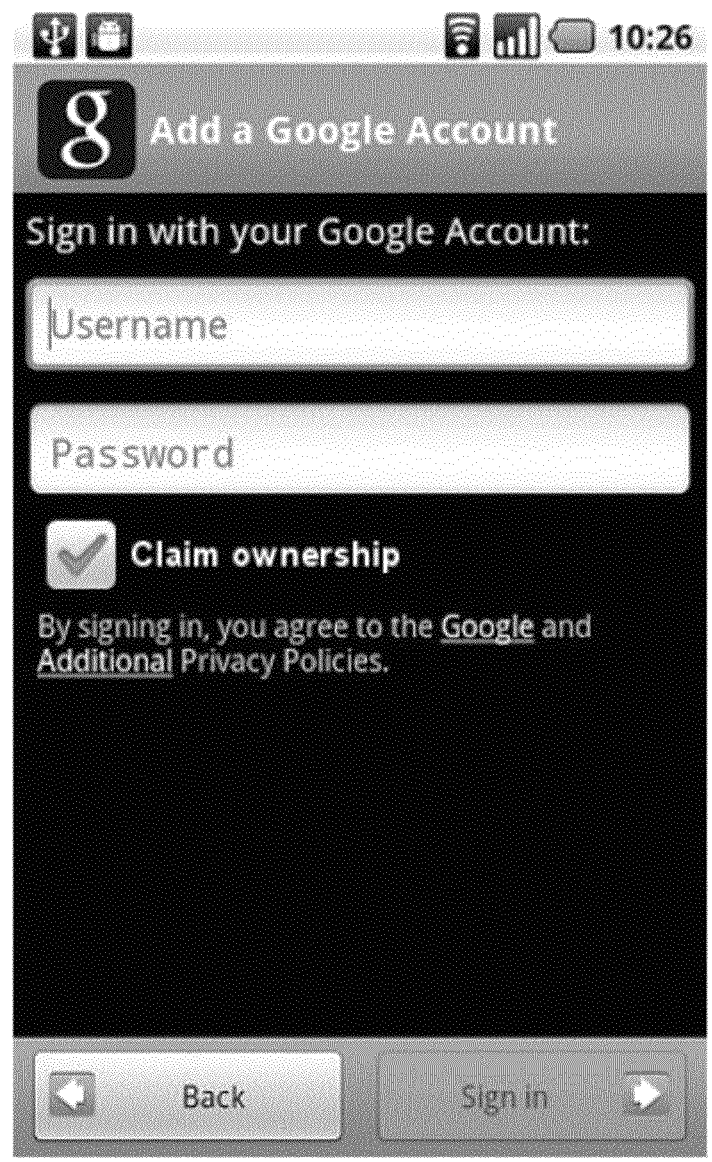
FIG. 3 is an example user interface illustrating ownership initialization, in accordance with an embodiment of the disclosure.

FIG. 3 is an example user interface illustrating ownership initialization, in accordance with an embodiment of the disclosure. A phone with the aforementioned feature may be associated with a Google Account of the owner. When a mobile device is first turned on after purchase, a screen 300 may be displayed so that the user can add a Google account to the phone for data syncing. The screen may have a checkbox labeled "Claim ownership" checked by default. If the checkbox remains checked ownership may be established when the account is added. If the checkbox is not checked the account may be added without ownership established by the user.

Alternatively, the checkbox may not be shown at all and ownership is implicitly established if there is no owner and it is the first time the mobile device is being turned on after a device wipe or after it was sold to its first owner.

Figure 4:
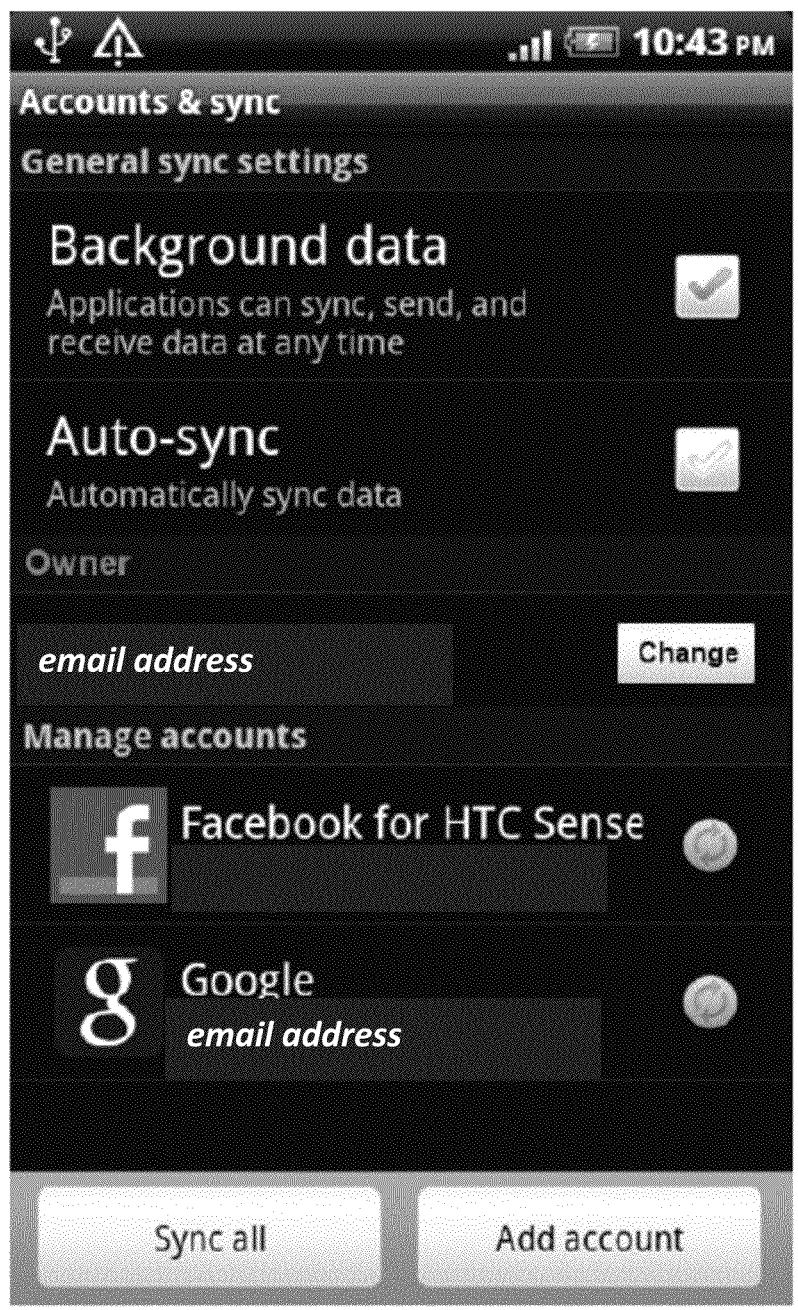
FIG. 4 is an example user interface illustrating changing ownership, in accordance with an embodiment of the disclosure.

FIG. 4 is an example user interface illustrating changing ownership, in accordance with an embodiment of the disclosure. A phone may or may not have an owner. The only difference is that without an owner the remote services cannot be used. Any device without an owner can be claimed by the interacting user, that is anyone that has physical access to the device and can use its software (i.e. has permission to unlock it). Ownership may be claimed by selecting an option in the phone settings on the Accounts and Sync screen 400 and entering the credentials of the Google account of the user that will own the phone. This may occur at the same time as a Google account is added to the device for data syncing. If the phone already has an owner, it is shown in the phone settings alongside an option to change it. Without ownership, the name of the account would not be shown and a button "Claim ownership" may be shown instead.

It must be possible to sever an existing ownership relationship to enable legal device resale. Terminating ownership may be done in one of several ways. For example, the "Change" button may read "Give up", as in "Give up ownership." Changing the owner may consist of two steps—first giving up (terminating) ownership and then claiming it with another account.

Figure 5:
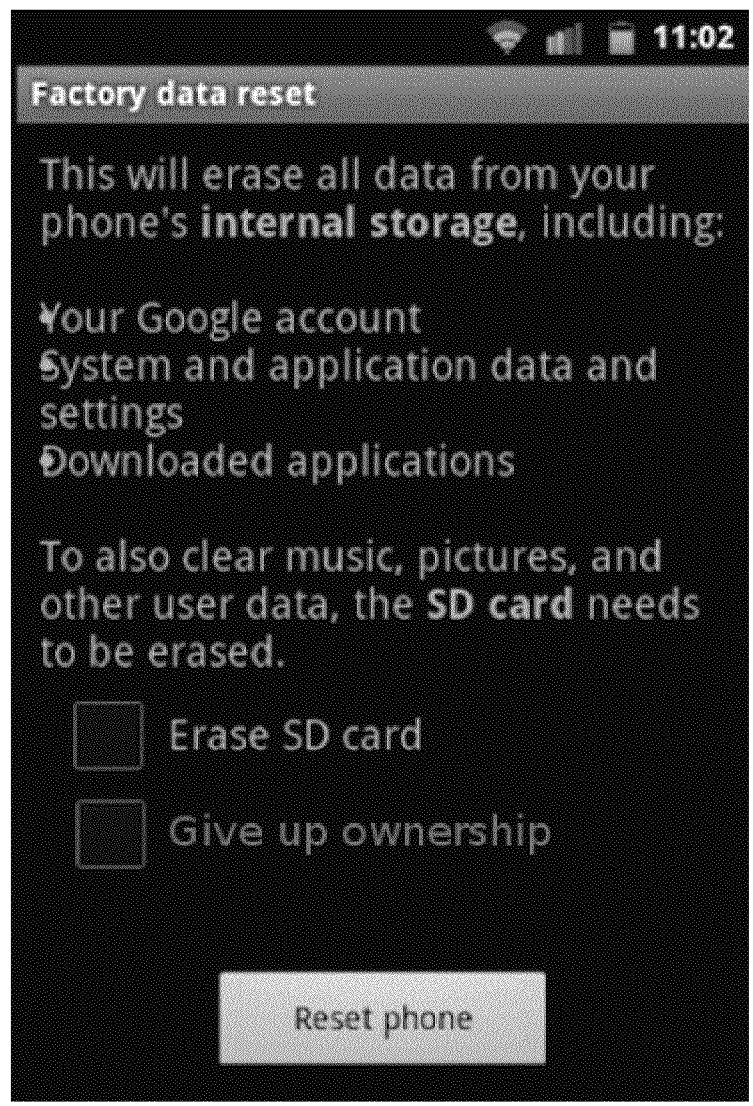
FIG. 5 is an example user interface illustrating terminating ownership, in accordance with an embodiment of the disclosure.

FIG. 5 is an example user interface illustrating another way of terminating ownership, in accordance with an embodiment of the disclosure. For example, an owner may perform a factory reset and then check a box labeled "Give up ownership" on the Factory data reset screen 500.

Accordingly, the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A server for communication with a mobile device, wherein the server comprises:
    a memory that operates to store a unique identifier associated with the mobile device;
    a network connection that operates to receive a command intended for the mobile device;
    a processor that operates to verify ownership of the mobile device according to the unique identifier and an online identity of the user, wherein the ownership of the mobile device is automatically established by adding an account to the mobile device after a device wipe or after the mobile device is first sold; and a transmitter that operates to transmit the command to the mobile device.

2. The server of claim 1, wherein the command instructs the mobile device to perform one or more functions.

3. The server of claim 2, wherein the one or more functions comprise locating the mobile device based on a GPS signal; disabling the mobile device; removing data from the mobile device;

controlling an audiovisual output from the mobile device; and reenabling a previously disabled mobile device.

4. The server of claim 1, wherein the unique identifier is stored in the memory when the ownership of the mobile device is established by the user.

5. The server of claim 1, wherein the unique identifier is updated according to a change in the mobile device.

6. The server of claim 1, wherein the command is encrypted by a user according to a passkey.

7. The server of claim 6, wherein the passkey is unknown to the server.

8. The server of claim 1, wherein the mobile device is unresponsive to a command that is generated by the server.

9. The server of claim 1, wherein the network connection operates to transmit the response from the mobile device to the user.

10. A mobile device in a communication network, wherein the mobile device comprises:

a unique identifier;

a receiver that operates to receive a command from a server, wherein the server verifies an ownership of the mobile device prior to sending the command to the mobile device, and wherein the ownership of the mobile device is automatically established by adding an account to the mobile device after a device wipe or after the mobile device is first sold;

a processor that operates to decrypt and execute the command; and a transmitter that operates to send a response to the user via the server according to a result of the command.

11. The mobile device of claim 10, wherein the response enables the user to locate the mobile device.

12. The mobile device of claim 10, wherein the response acknowledges that the command has been executed by the mobile device.

13. The mobile device of claim 10, wherein server is operable to store the unique identifier and verify the ownership of the mobile device by using the unique identifier.

14. The mobile device of claim 10, wherein the passkey is unknown to the server.

15. The mobile device of claim 10, wherein the mobile device is unresponsive to a command that is generated by the server.

16. A method for secure control of a mobile device, wherein the method comprises:

storing, by a computing device, a unique identifier associated with the mobile device;

receiving a command intended for the mobile device;

verifying, by the computing device, an ownership of the mobile device according to the unique identifier, wherein the ownership of the mobile device is automatically established by adding an account to the mobile device after a device wipe or after the mobile device is first sold;

transmitting the command to the mobile device.

17. The method of claim 16, wherein the command is encrypted by a user according to a passkey and verifying the ownership of the mobile device does not require decrypting the encrypted command.

18. The method of claim 16, wherein ownership of the mobile device is terminated by performing a factory reset and selecting an option to sever the ownership.

* * * * *